US008846585B2

(12) United States Patent
Falana et al.

(10) Patent No.: US 8,846,585 B2
(45) Date of Patent: Sep. 30, 2014

(54) DEFOAMER FORMULATION AND METHODS FOR MAKING AND USING SAME

(75) Inventors: Olusegun Matthew Falana, San Antonio, TX (US); Marshall C. Edward, Schertz, TX (US); Frank Zamora, San Antonio, TX (US)

(73) Assignee: Clearwater International, LLC, Houston, TX (US)

( * ) Notice: Subject to any disclaimer, the term of this patent is extended or adjusted under 35 U.S.C. 154(b) by 231 days.

(21) Appl. No.: 12/885,102

(22) Filed: Sep. 17, 2010

(65) Prior Publication Data
US 2012/0071370 A1    Mar. 22, 2012

(51) Int. Cl.
  *C09K 8/60*   (2006.01)
  *C09K 8/00*   (2006.01)
  *C09K 8/74*   (2006.01)
  *C09K 8/528*  (2006.01)
  *C09K 8/38*   (2006.01)
  *C09K 8/42*   (2006.01)
  *C09K 8/94*   (2006.01)
  *B01D 19/04*  (2006.01)
  *C09K 8/70*   (2006.01)

(52) U.S. Cl.
  CPC ............ *B01D 19/0409* (2013.01); *C09K 8/528* (2013.01); *C09K 2208/32* (2013.01); *C09K 8/38* (2013.01); *C09K 8/42* (2013.01); *C09K 8/94* (2013.01); *C09K 8/703* (2013.01)
  USPC ............................. 507/233; 507/140; 507/269

(58) Field of Classification Search
  USPC .................. 507/140, 233, 269; 166/308.6
  See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 2,805,958 A | 7/1959 | Bueche et al. | 106/308 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,618,666 A * | 11/1971 | Sayers | 166/272.3 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,052,159 A | 10/1977 | Fuerst et al. | |
| 4,067,389 A | 1/1978 | Savins | 166/246 |
| 4,108,782 A | 8/1978 | Thompson | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,378,845 A | 4/1983 | Medlin et al. | 166/297 |
| 4,461,716 A | 7/1984 | Barbarin et al. | 252/307 |
| 4,479,041 A | 10/1984 | Fenwick et al. | 200/81 R |
| 4,506,734 A | 3/1985 | Nolte | 166/308.1 |
| 4,514,309 A | 4/1985 | Wadhwa | 507/211 |
| 4,541,935 A | 9/1985 | Constien et al. | 507/225 |
| 4,549,608 A | 10/1985 | Stowe et al. | 166/280.1 |
| 4,561,985 A | 12/1985 | Glass, Jr. | 507/108 |
| 4,623,021 A | 11/1986 | Stowe | 166/250.1 |
| 4,654,266 A | 3/1987 | Kachnik | 428/403 |
| 4,657,081 A | 4/1987 | Hodge | 166/380.5 |
| 4,660,643 A | 4/1987 | Perkins | 166/283 |
| 4,683,068 A | 7/1987 | Kucera | 507/201 |
| 4,686,052 A | 8/1987 | Baranet et al. | 507/244 |
| 4,695,389 A | 9/1987 | Kubala | 507/244 |
| 4,705,113 A | 11/1987 | Perkins | 166/302 |
| 4,714,115 A | 12/1987 | Uhri | 166/308.1 |
| 4,718,490 A | 1/1988 | Uhri | 166/281 |
| 4,724,905 A | 2/1988 | Uhri | 166/250.1 |
| 4,725,372 A | 2/1988 | Teot et al. | 507/129 |
| 4,739,834 A | 4/1988 | Peiffer et al. | 166/380.4 |
| 4,741,401 A | 5/1988 | Walles et al. | 166/300 |
| 4,748,011 A | 5/1988 | Baize | 423/228 |
| 4,779,680 A | 10/1988 | Sydansk | 166/300 |

(Continued)

FOREIGN PATENT DOCUMENTS

| | | | | |
|---|---|---|---|---|
| CA | 2125513 | 1/1995 | | |
| DE | 4027300 | 5/1992 | ............ | B10D 53/14 |
| GB | 775376 | 10/1954 | | |
| GB | 1073338 A | 6/1967 | | |
| JP | 10001461 | 6/1988 | ............ | C07C 211/50 |
| JP | 08151422 | 11/1996 | | |
| JP | 10110115 A | 4/1998 | | |
| JP | 2005194148 A | 7/2005 | | |
| WO | WO 98/56497 | 12/1998 | | |

OTHER PUBLICATIONS

U.S. Appl. No. 12/075,461, filed Mar. 11, 2008, Gatlin et al.
U.S. Appl. No. 11/554,834, filed Oct. 31, 2006, Venditto et al.
U.S. Appl. No. 11/765,306, filed Jun. 19, 2007, Kakadjian et al.
U.S. Appl. No. 11/748,248, filed May 14, 2007, Thompson et al.
U.S. Appl. No. 11/736,971, filed Apr. 18, 2007, Kippie et al.
U.S. Appl. No. 11/767,384, filed Jun. 22, 2007, Sweeney et al.
U.S. Appl. No. 11/741,110, filed Apr. 27, 2007, Wilson, Jr. et al.
U.S. Appl. No. 11/677,434, filed Feb. 21, 2007, Wanner et al.
U.S. Appl. No. 11/736,992, filed Apr. 18, 2007, Zamora et al.
U.S. Appl. No. 11/760,581, filed Jun. 8, 2007, Schwartz.
U.S. Appl. No. 12/029,335, filed Feb. 11, 2008, Kakadjian et al.

*Primary Examiner* — Aiqun Li
(74) *Attorney, Agent, or Firm* — Robert W. Strozier

(57) ABSTRACT

Defoamer compositions are disclosed and methods for making and using same, where the defoamer has universal applicability at low concentrations. The defoamer compositions include between 40 vol. % and about 80 vol. % distilled water (other waters may be used instead), 10 vol. % and about 30 vol. % of silicon anti-foam agent and between about 10 vol. % and about 30 vol. % of active silicon anti-foam agent. The defoamer compositions are used in amount of less than or equal to 200 ppm in all foamed downhole fluid systems.

20 Claims, No Drawings

(56) References Cited

U.S. PATENT DOCUMENTS

| | | | |
|---|---|---|---|
| 4,795,574 A | 1/1989 | Syrinek et al. | 507/238 |
| 4,817,717 A | 4/1989 | Jennings, Jr. et al. | 166/278 |
| 4,830,106 A | 5/1989 | Uhri | 166/250.1 |
| 4,846,277 A | 7/1989 | Khalil et al. | 166/280.1 |
| 4,848,468 A | 7/1989 | Hazlett et al. | 166/300 |
| 4,852,650 A | 8/1989 | Jennings, Jr. et al. | 166/250.1 |
| 4,869,322 A | 9/1989 | Vogt, Jr. et al. | 166/280.1 |
| 4,892,147 A | 1/1990 | Jennings, Jr. et al. | 166/280.2 |
| 4,926,940 A | 5/1990 | Stromswold | 166/247 |
| 4,938,286 A | 7/1990 | Jennings, Jr. | 166/280.1 |
| 4,978,512 A | 12/1990 | Dillon | 423/226 |
| 5,005,645 A | 4/1991 | Jennings, Jr. et al. | 166/280.1 |
| 5,024,276 A | 6/1991 | Borchardt | 166/308.6 |
| 5,067,556 A | 11/1991 | Fudono et al. | 62/196.4 |
| 5,074,359 A | 12/1991 | Schmidt | 166/280.1 |
| 5,074,991 A | 12/1991 | Weers | 208/236 |
| 5,082,579 A | 1/1992 | Dawson | 507/211 |
| 5,106,518 A | 4/1992 | Cooney et al. | 507/21 |
| 5,110,486 A | 5/1992 | Manalastas et al. | 507/260 |
| 5,169,411 A | 12/1992 | Weers | 44/421 |
| 5,224,546 A | 7/1993 | Smith et al. | 166/300 |
| 5,228,510 A | 7/1993 | Jennings, Jr. et al. | 166/263 |
| 5,246,073 A | 9/1993 | Sandiford et al. | 166/295 |
| 5,259,455 A | 11/1993 | Nimerick et al. | 166/308.5 |
| 5,330,005 A | 7/1994 | Card et al. | 166/280.2 |
| 5,342,530 A | 8/1994 | Aften et al. | 252/8.551 |
| 5,347,004 A | 9/1994 | Rivers et al. | 544/180 |
| 5,363,919 A | 11/1994 | Jennings, Jr. | 166/308.1 |
| 5,402,846 A | 4/1995 | Jennings, Jr. et al. | 166/259 |
| 5,411,091 A | 5/1995 | Jennings, Jr. | 166/280.1 |
| 5,424,284 A | 6/1995 | Patel et al. | 507/129 |
| 5,439,055 A | 8/1995 | Card et al. | 166/280.2 |
| 5,462,721 A | 10/1995 | Pounds et al. | 423/226 |
| 5,465,792 A | 11/1995 | Dawson et al. | 166/295 |
| 5,472,049 A | 12/1995 | Chaffee et al. | 166/250.1 |
| 5,482,116 A | 1/1996 | El-Rabaa et al. | 166/250.1 |
| 5,488,083 A | 1/1996 | Kinsey, III et al. | 507/211 |
| 5,497,831 A | 3/1996 | Hainey et al. | 166/308.1 |
| 5,501,275 A | 3/1996 | Card et al. | 166/280.2 |
| 5,539,044 A * | 7/1996 | Dindi et al. | 524/570 |
| 5,551,516 A | 9/1996 | Norman et al. | 166/308.2 |
| 5,624,886 A | 4/1997 | Dawson et al. | 507/217 |
| 5,635,458 A | 6/1997 | Lee et al. | 507/240 |
| 5,649,596 A | 7/1997 | Jones et al. | 166/300 |
| 5,669,447 A | 9/1997 | Walker et al. | 166/300 |
| 5,674,377 A | 10/1997 | Sullivan, III et al. | 208/208 R |
| 5,688,478 A | 11/1997 | Pounds et al. | 423/228 |
| 5,693,837 A | 12/1997 | Smith et al. | 556/148 |
| 5,711,396 A | 1/1998 | Joerg et al. | 180/444 |
| 5,722,490 A | 3/1998 | Ebinger | 166/281 |
| 5,744,024 A | 4/1998 | Sullivan, III et al. | 208/236 |
| 5,755,286 A | 5/1998 | Ebinger | 166/281 |
| 5,775,425 A | 7/1998 | Weaver et al. | 166/276 |
| 5,787,986 A | 8/1998 | Weaver et al. | 166/280.2 |
| 5,806,597 A | 9/1998 | Tjon-Joe-Pin et al. | 166/300 |
| 5,807,812 A | 9/1998 | Smith et al. | 507/238 |
| 5,833,000 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 5,877,127 A | 3/1999 | Card et al. | 507/273 |
| 5,908,073 A | 6/1999 | Nguyen et al. | 166/276 |
| 5,908,814 A | 6/1999 | Patel et al. | 507/131 |
| 5,964,295 A | 10/1999 | Brown et al. | 166/308.2 |
| 5,979,557 A | 11/1999 | Card et al. | 166/300 |
| 5,980,845 A | 11/1999 | Cherry | 423/229 |
| 6,001,887 A * | 12/1999 | Keup et al. | 516/118 |
| 6,016,871 A | 1/2000 | Burts, Jr. | 166/300 |
| 6,035,936 A | 3/2000 | Whalen | 166/308.5 |
| 6,047,772 A | 4/2000 | Weaver et al. | 166/276 |
| 6,054,417 A | 4/2000 | Graham et al. | 507/238 |
| 6,059,034 A | 5/2000 | Rickards et al. | 166/280.2 |
| 6,060,436 A | 5/2000 | Snyder et al. | 507/266 |
| 6,069,118 A | 5/2000 | Hinkel et al. | 507/277 |
| 6,123,394 A | 9/2000 | Jeffrey | 299/16 |
| 6,133,205 A | 10/2000 | Jones | 507/276 |
| 6,147,034 A | 11/2000 | Jones et al. | 507/238 |
| 6,162,449 A | 12/2000 | Maier et al. | 424/401 |
| 6,162,766 A | 12/2000 | Muir et al. | 507/267 |
| 6,169,058 B1 | 1/2001 | Le et al. | 507/222 |
| 6,228,812 B1 | 5/2001 | Dawson et al. | 507/221 |
| 6,247,543 B1 | 6/2001 | Patel et al. | 175/64 |
| 6,267,938 B1 | 7/2001 | Warrender et al. | 423/226 |
| 6,283,212 B1 | 9/2001 | Hinkel et al. | 166/279 |
| 6,291,405 B1 | 9/2001 | Lee et al. | 507/136 |
| 6,330,916 B1 | 12/2001 | Rickards et al. | 166/280.2 |
| 6,725,931 B2 | 4/2004 | Nguyen et al. | 166/280.2 |
| 6,756,345 B2 | 6/2004 | Pakulski et al. | 507/246 |
| 6,793,018 B2 | 9/2004 | Dawson et al. | 166/300 |
| 6,832,650 B2 | 12/2004 | Nguyen et al. | 166/279 |
| 6,875,728 B2 | 4/2005 | Gupta et al. | 507/240 |
| 7,140,433 B2 | 11/2006 | Gatlin et al. | 166/250.01 |
| 7,268,100 B2 | 9/2007 | Kippie et al. | 507/244 |
| 7,350,579 B2 | 4/2008 | Gatlin et al. | 166/308.3 |
| 2002/0049256 A1 | 4/2002 | Bergeron, Jr. | 514/674 |
| 2002/0165308 A1 | 11/2002 | Kinniard et al. | 524/492 |
| 2003/0220204 A1 | 11/2003 | Baran, Jr. et al. | 507/200 |
| 2005/0045330 A1 | 3/2005 | Nguyen et al. | 166/281 |
| 2005/0070660 A1 * | 3/2005 | Bode et al. | 524/542 |
| 2005/0092489 A1 | 5/2005 | Welton et al. | 166/280.2 |
| 2005/0137114 A1 | 6/2005 | Gatlin et al. | 510/424 |
| 2005/0153846 A1 | 7/2005 | Gatlin | 208/236 |
| 2005/0250666 A1 | 11/2005 | Gatlin et al. | 510/492 |
| 2006/0194700 A1 | 8/2006 | Gatlin et al. | 507/203 |
| 2007/0032693 A1 | 2/2007 | Gatlin et al. | 507/239 |
| 2007/0129257 A1 | 6/2007 | Kippie et al. | 507/102 |
| 2007/0131425 A1 | 6/2007 | Gatlin et al. | 166/280.2 |
| 2007/0173413 A1 | 7/2007 | Lukocs et al. | 507/238 |
| 2007/0173414 A1 | 7/2007 | Wilson | 507/131 |
| 2008/0039345 A1 | 2/2008 | Kippie et al. | 507/213 |

\* cited by examiner

DEFOAMER FORMULATION AND METHODS FOR MAKING AND USING SAME

BACKGROUND OF THE INVENTION

1. Field of the Invention

Embodiments of this invention relate to a defoamer for use in recyclable foamable systems for use in all downhole operations including drilling, fracturing, completion, cementing, stimulating, and/or enhancing operations, where the defoamer has consistent activity across all downhole operations making the defoamer universal.

More particularly, embodiments of this invention relate to a universal defoamer for use in foamable systems for use in all downhole operation including drilling, fracturing, completion, cementing, stimulating, and/or enhancing operations, where the defoamer includes a combination of silicone-based antifoam agents at concentrations with effective and efficient characteristic defoaming potency.

2. Description of the Related Art

Frequently, drilling fluid, fracturing fluid, completion fluid, cementing, stimulating fluid systems are designed to produce foams with suitable characteristics for specific drilling or related operations. The ability to reuse the systems is always advantageous to curtail chemical usage and handling as well as overall economics of an operation. Despite the obvious advantages, a great number of drilling systems cannot be reused or recycled, because of the lack of suitable defoamer systems that permit foam-defoam and refoam cycles. Though, some known defoamers permit reuse of fluid systems, nevertheless, they are not environmentally benign.

In prior art, the primary objective was always to formulate a suitable system to meet end use conditions. End use conditions like temperature, pH, salinity, contaminants, base fluid and so on are examples. Once a suitable system has been formulated, recyclability for instance, as much as it is desirable, is a secondary consideration. Hence, there are many fluid systems that are for single pass operations, with only few being recyclable.

While there are many defoamers and defoaming systems, there is a continued need in the art for defoamers and defoamer systems that have consistent performance properties across all downhole operations and all foaming fluid systems, especially at low concentrations, ≤200 ppm, while maintaining the ability for the foam systems to be refoamed or to undergo a number of foam-defoam-refoam cycles.

SUMMARY OF THE INVENTION

Embodiments of defoamer compositions of this invention include on a volume basis between about 40 vol. % and about 80 vol. % distilled water (other waters may be used instead), between about 10 vol. % and about 30 vol. % of silicone anti-foam agent and between about 10 vol. % and about 30 vol. % of active silicone anti-foam agent, where the composition is stable at temperatures up to about 450° F. and is effective at concentration of less than or equal to 500 ppm in all foamed fluids used in downhole applications. The foamed fluids include foamed drilling fluids, foamed completion fluids, foamed fracturing fluids, foamed stimulating fluids, foaming cements, and/or other foamed fluids used in downhole operations.

Embodiments of methods of using the defoamer compositions of this invention include adding an effective amount of a defoamer composition of this invention to a foamed fluid, where the amount is sufficient to result in a clean break of the foamed fluid, where the defoamer composition includes on a volume basis between about 40 vol. % and about 80 vol. % distilled water (other waters may be used instead), between about 10 vol. % and about 30 vol. % of silicone anti-foam agent and between about 10 vol. % and about 30 vol. % of active silicone anti-foam agent and where the effective amount is an amount of the defoamer composition of less than or equal to about 500 ppm regardless of the foamed fluid type and where the defoaming composition is stable at temperatures up to about 450° F. and where the defoamer composition permits repeated foam-defoam recycles, generally with the addition of additional foaming composition.

DEFINITIONS OF TERM USED IN THE INVENTION

The following definitions are provided in order to aid those skilled in the art in understanding the detailed description of the present invention.

The term "fracturing" refers to the process and methods of breaking down a geological formation, i.e. the rock formation around a well bore, by pumping fluid at very high pressures, in order to increase production rates from a hydrocarbon reservoir. The fracturing methods of this invention use otherwise conventional techniques known in the art.

The term "surfactant" refers to a soluble, or partially soluble compound that reduces the surface tension of liquids, or reduces inter-facial tension between two liquids, or a liquid and a solid by congregating and orienting itself at these interfaces.

The term "drilling fluids" refers to any fluid that is used during oil and/or gas well drilling operations.

The term "completion fluids" refers to any fluid that is used in oil and/or gas well completion operations.

The term "production fluids" refers to any fluid that is used in oil and/or gas well production operations.

An under-balanced and/or managed pressure drilling fluid means a drilling fluid having a circulating hydrostatic density (pressure) lower or equal to a formation density (pressure). For example, if a known formation at 10,000 ft (True Vertical Depth—TVD) has a hydrostatic pressure of 5,000 psi or 9.6 lbm/gal, an under-balanced drilling fluid would have a hydrostatic pressure less than or equal to 9.6 lbm/gal. Most under-balanced and/or managed pressure drilling fluids include at least a density reduction additive. Other additive many include a corrosion inhibitor, a pH modifier and a shale inhibitor.

The term "foamable" means a composition that when mixed with a gas forms a stable foam.

The term "gpt" means gallons per thousand gallons.

The term "ppt" means pounds per thousand gallons.

DETAILED DESCRIPTION OF THE INVENTION

The inventors have found that defoamer compositions can be formulated that are universally efficient and effective at defoaming a wide variety of foamed fluid systems used in downhole operations, while refoamability is maintained. The inventors have found that the defoamer compositions of this invention can be used in low concentrations in these foamed fluid systems to fully break the foams. The inventors have also found that the defoamer compositions of this invention are environmentally benign. In certain embodiments, the defoamer compositions of this invention include an effective amount of DOW CORNING® ANTIFOAM available from Dow Corning, which comprises 60.0 wt. % of water, 7.0-13.0 wt. % of a polydimethylsiloxane, and optionally 5.0 wt. % of methylcellulose.

For the first time, the inventors have been able to develop a defoamer that is compatible with all foam systems known to the inventors. Not only do the defoamer compositions of this invention, defoam a wide variety of fluid systems used in downhole operations, the defoamer compositions allow the foamed fluid system to be reused or to undergo foam-defoam and refoam cycles. Most known defoamers are alcohols, mixture of alcohols, ethers, hydrocarbon, or other combinations thereof. Many of these defoamers are hazardous to the environment, while the defoamer compositions of this invention may be used without special handling and disposal requirements. The defoamer compositions of this invention are effective and efficient at low concentrations of less than or equal to about 200 ppm, while most competitive defoamers are effective at concentration of greater than or equal to about 2,000 ppm. Therefore, the defoamer compositions of this invention are more cost effective, than other well known defoamers currently used in the market.

The defoamer compositions of this invention have been successfully tested in the field. The defoamer compositions of this invention may formulated into green chemistry compositions. The inventors have found that the defoamer compositions of this invention combine several unique features that are superior to defoamers described in prior art. The defoamer compositions of this invention are thermal stable up to 450° F., are environmentally benign, are robust in their ability to defoam diverse foaming systems under different operating conditions, while retaining the usability of foaming systems—maintain the foaming systems ability to undergo repeated foam-defoam-refoam cycles. The defoamer compositions of this invention have effective and efficient defoaming properties even at low concentrations and are compatible with drilling fluids additives, completion fluid additives, fracturing fluid additives, cement additives and additives used in other downhole operations that utilized foaming systems. The defoamer compositions of this invention are also more affordable than many other defoaming system currently known. The defoamer composition of this invention permit repeated foam-defoam cycles, where the number of foam-defoam cycles is at least 2. In other embodiments, the number of foam-defoam cycles is at least 5. In other embodiments, the number of foam-defoam cycles is at least 10.

Drilling Fluids

Generally, foamed drilling fluid are used during the drilling of a well. Foamed drilling fluids may be designed for so-called under-balanced drilling (a hydrostatic pressure of the drilling fluid is lower than the pore pressure of the formation) or managed pressure drilling, where the hydrostatic pressure of the drilling fluid is managed depending on the nature of the material through which drilling is occurring and is generally foamed to reduce hydrostatic pressure of the drilling fluid relative to the formation hydrostatic pressure to reduce fluid penetration into the formation. The defoamer compositions of this invention are designed to defoam such drilling fluids at low concentration, even drilling fluids operating at temperatures up to 450° F.

Embodiments of the present invention relate to using the defoamer compositions of this invention to defoam foamed drilling fluids, where an effective amount of a defoamer composition of this invention is added to the foamed drilling fluid to break the foam. The defoaming compositions of this invention include aqueous solutions of silicone-based antifoamers. Suitable antifoamers are exemplified by DOW CORNING® ANTIFOAM B and DOW CORNING® ANTIFOAM 1410 that are available from Dow Corning, where DOW CORNING® ANTIFOAM 1410 contains 70.0 wt. %-90.0 wt. % Water, 7.0 wt. %-13.0 wt. % polydimethylsiloxane, 1.0 wt. %-5.0 wt. % hydroxyethyl cellulose, 1.0 wt. %-5.0 wt. % treated amorphous silica, and <1.0 wt. % Glycerides, C14-18, mono- and di. The effective amount of the defoaming composition is an amount sufficient to break the foam or reduce the foam height to zero or near zero (where near means within 5% of zero foam height). In certain embodiments, the effective amount is less than or equal to about 200 ppm.

Completion Fluids

Embodiments of the present invention relate to defoaming or breaking foamed completion fluids, where the foamed completion fluids are defoamed with the addition of an effective amount of a defoamer compositions of this invention, where the effective amount is less than or equal to about 200 ppm.

Fracturing Fluids

Embodiments of the present invention relate to using the defoamer compositions of this invention to defoam foamed fracturing fluids, where the foamed fracturing fluids are defoamed with the addition of an effective amount of a defoamer compositions of this invention, where the effective amount is less than or equal to about 200 ppm. For additional information on fracturing fluid components that may be used with the fracturing fluids of this invention the reader is referred to U.S. Pat. Nos. 7,140,433, 7,517,447, 7,268,100, 7,392,847, 7,350,579, 7,712,535, and 7,565,933; and United States Published Applications Nos. 20070032693, 20050137114, 20090250659, 20050250666, 20080039345, 20060194700, 20070173414, 20070129257, 20080257553, 20090203553, 20070173413, 20080318812, 20080287325, 20080314124, 20080269082, 20080197085, 20080257554, 20080251252, 20090151959, 20090200033, 20090200027, 20100000795, 20100012901, 20090067931, 20080283242, 20100077938, 20100122815, and 20090275488. These applications and patents are incorporated by reference through the operation of the last paragraph of the specification.

Stimulating Fluids

Embodiments of the present invention relate to using the defoamer compositions of this invention to defoam foamed stimulating fluids, where the foamed stimulating fluids are defoamed with the addition of an effective amount of a defoamer compositions of this invention, where the effective amount is less than or equal to about 200 ppm.

Compositional Ranges

In certain embodiments, the defoamer compositions of this invention include on a volume basis between about 40 vol. % and about 80 vol. % distilled water (other waters may be used instead), between about 10 vol. % and about 30 vol. % of silicone anti-foam agent and between about 10 vol. % and about 30 vol. % of active silicone anti-foam agent. In other embodiments, the defoamer compositions of this invention include on a volume bases between about 50 vol. % and about 80 vol. % distilled water (other waters may be used instead), between about 10 vol. % and about 25 vol. % of silicone anti-foam agent and between about 10 vol. % and about 25 vol. % of active silicone anti-foam agent. In other embodiments, defoamer compositions of this invention include on a volume bases between about 60 vol. % and about 80 vol. % distilled water (other waters may be used instead), between about 10 vol. % and about 20 vol. % of silicone anti-foam agent and between about 10 vol. % and about 20 vol. % of active silicone anti-foam agent. In other embodiments, defoamer compositions of this invention include on a volume bases between about 50 vol. % and about 70 vol. % distilled water (other waters may be used instead), between about 15 vol. % and about 25 vol. % of silicone anti-foam agent and between about 15 vol. % and about 25 vol. % of active silicone anti-foam agent. In certain embodiments, the silicone anti-foam agent is DOW CORNING® ANTIFOAM B available from Dow Corning and the active silicone anti-foam agent is DOW CORNING® ANTIFOAM 1410 available from Dow Corning. The defoaming compositions are a milky white liquids having a pH of about 7.03 and a specific gravity of about 0.997.

Foaming Composition Ranges

Generally, the amount of defoaming agent added to defoam the lightened well fluids is a vol. % amount sufficient to break the foam. In one embodiment, the defoaming composition is used in ranges from about 0.05 vol. % to about 5 vol. %. In another embodiment, the defoaming composition is used in ranges from about 0.1 vol. % to about 2.5 vol. %. In another embodiment, the defoaming composition is used in ranges from about 0.1 vol. % to about 1.0 vol. %. In another embodiment, the defoaming composition is used in ranges from about 0.25 vol. % to about 0.5 vol. %. In other embodiments, the defoaming composition is used in an effective amount of less than or equal to 500 ppm. In other embodiments, the defoaming composition is used in an effective amount of less than or equal to 400 ppm. In other embodiments, the defoaming composition is used in an effective amount of less than or equal to 300 ppm. In other embodiments, the defoaming composition is used in an effective amount of less than or equal to 250 ppm. In other embodiments, the defoaming composition is used in an effective amount of less than or equal to 200 ppm.

Suitable Reagents

Suitable water-based defoaming reagents for use in the defoamer compositions of this invention include, without limitation, a mixture of silicone agents that have anti-foam activity, where the mixtures include at least one polydimethylsioxane and where the defoamer compositions are effective in amount less than or equal to about 200 ppm and stable at temperatures to 450° F. and is universally applicable to all known foaming agents. In certain embodiments, the mixture including Antifoam B and Antifoam 4010.

Suitable Drilling Fluid Components

Suitable aqueous base fluids includes, without limitation, seawater, freshwater, saline water or such makeup system containing up to about 30% crude oil.

Suitable foaming agents for use in this invention include, without limitation, any foaming agent suitable for foaming aqueous based drilling fluids. Exemplary examples of foaming agents include, without limitation KLEANFOAM™, DURAFOAM™, FMA-100™, TRANSFOAM™ (all available from Weatherford International) or mixture or combinations.

Suitable polymers for use in this invention include, without limitation, any polymer soluble in the aqueous base fluid. Exemplary polymers include, without limitation, a polymer comprising units of one or more (one, two, three, four, five, . . ., as many as desired) polymerizable salts of mono-olefins or di-olefins. Exemplary examples includes, without limitation, natural polymers (starch, hydroxymethyl cellulose, xanthan, guar, etc.) and derivates; co-polymerizable monomers such as acrylates (acrylic acid, methyl acrylate, ethyl acrylate, etc.), methacrylates (methacrylic acid, methyl methacrylate, ethyl methacrylate, etc), 2-acrylamindomethylpropane sulfonic acid, vinylacetate, acrylamide, or the like, provided of course that the resulting polymer is soluble in the water base fluid.

Gases

Suitable gases for foaming the foamable, ionically coupled gel composition include, without limitation, nitrogen, carbon dioxide, or any other gas suitable for use in formation fracturing, or mixtures or combinations thereof.

Corrosion Inhibitors

Suitable corrosion inhibitor for use in this invention include, without limitation: quaternary ammonium salts e.g., chloride, bromides, iodides, dimethylsulfates, diethylsulfates, nitrites, bicarbonates, carbonates, hydroxides, alkoxides, or the like, or mixtures or combinations thereof; salts of nitrogen bases; or mixtures or combinations thereof. Exemplary quaternary ammonium salts include, without limitation, quaternary ammonium salts from an amine and a quaternarization agent, e.g., alkylchlorides, alkylbromide, alkyl iodides, alkyl sulfates such as dimethyl sulfate, diethyl sulfate, etc., dihalogenated alkanes such as dichloroethane, dichloropropane, dichloroethyl ether, epichlorohydrin adducts of alcohols, ethoxylates, or the like; or mixtures or combinations thereof and an amine agent, e.g., alkylpyridines, especially, highly alkylated alkylpyridines, alkyl quinolines, C6 to C24 synthetic tertiary amines, amines derived from natural products such as coconuts, or the like, dialkylsubstituted methyl amines, amines derived from the reaction of fatty acids or oils and polyamines, amidoimidazolines of DETA and fatty acids, imidazolines of ethylenediamine, imidazolines of diaminocyclohexane, imidazolines of aminoethylethylenediamine, pyrimidine of propane diamine and alkylated propene diamine, oxyalkylated mono and polyamines sufficient to convert all labile hydrogen atoms in the amines to oxygen containing groups, or the like or mixtures or combinations thereof. Exemplary examples of salts of nitrogen bases, include, without limitation, salts of nitrogen bases derived from a salt, e.g.: C1 to C8 monocarboxylic acids such as formic acid, acetic acid, propanoic acid, butanoic acid, pentanoic acid, hexanoic acid, heptanoic acid, octanoic acid, 2-ethylhexanoic acid, or the like; C2 to C12 dicarboxylic acids, C2 to C12 unsaturated carboxylic acids and anhydrides, or the like; polyacids such as diglycolic acid, aspartic acid, citric acid, or the like; hydroxy acids such as lactic acid, itaconic acid, or the like; aryl and hydroxy aryl acids; naturally or synthetic amino acids; thioacids such as thioglycolic acid (TGA); free acid forms of phosphoric acid derivatives of glycol, ethoxylates, ethoxylated amine, or the like, and aminosulfonic acids; or mixtures or combinations thereof and an amine, e.g.: high molecular weight fatty acid amines such as cocoamine, tallow amines, or the like; oxyalkylated fatty acid amines; high molecular weight fatty acid polyamines (di, tri, tetra, or higher); oxyalkylated fatty acid polyamines; amino amides such as reaction products of carboxylic acid with polyamines where the equivalents of carboxylic acid is less than the equivalents of reactive amines and oxyalkylated derivatives thereof; fatty acid pyrimidines; monoimidazolines of EDA, DETA or higher ethylene amines, hexamethylene diamine (HMDA), tetramethylenediamine (TMDA), and higher analogs thereof; bisimidazolines, imidazolines of mono and polyorganic acids; oxazolines derived from monoethanol amine and fatty acids or oils, fatty acid ether amines, mono and bis amides of aminoethylpiperazine; GAA and TGA salts of the reaction products of crude tall oil or distilled tall oil with diethylene triamine; GAA and TGA salts of reaction products of dimer acids with mixtures of poly amines such as TMDA, HMDA and 1,2-diaminocyclohexane; TGA salt of imidazoline derived from DETA with tall oil fatty acids or soy bean oil, canola oil, or the like; or mixtures or combinations thereof.

Other Additives

The drilling fluids of this invention can also include other additives as well such as scale inhibitors, carbon dioxide control additives, paraffin control additives, oxygen control additives, or other additives.

Scale Control

Suitable additives for Scale Control and useful in the compositions of this invention include, without limitation: Chelating agents, e.g., $Na^+$, $K^+$ or $NH_4^+$ salts of EDTA; Na, K or $NH_4^+$ salts of NTA; $Na^+$, $K^+$ or $NH_4^+$ salts of Erythorbic acid; $Na^+$, $K^+$ or $NH_4^+$ salts of thioglycolic acid (TGA); $Na^+$, $K^+$ or $NH_4^+$ salts of Hydroxy acetic acid; $Na^+$, $K^+$ or $NH_4^+$ salts of Citric acid; $Na^+$, $K^+$ or $NH_4^+$ salts of Tartaric acid or other similar salts or mixtures or combinations thereof. Suitable additives that work on threshold effects, sequestrants, include, without limitation: Phosphates, e.g., sodium hexamethylphosphate, linear phosphate salts, salts of polyphosphoric acid, Phosphonates, e.g., nonionic such as HEDP (hydroxythylidene diphosphoric acid), PBTC (phosphoisobutane, tricarboxylic acid), Amino phosphonates of: MEA (monoethanolamine), $NH_3$, EDA (ethylene diamine), Bishydroxyethylene diamine, Bisaminoethylether, DETA (diethylenetriamine), HMDA (hexamethylene diamine), Hyper homologues and isomers of HMDA, Polyamines of EDA and DETA, Diglycolamine and homologues, or similar polyamines or mixtures or combinations thereof; Phosphate esters, e.g., polyphosphoric acid esters or phosphorus pentoxide ($P_2O_5$) esters of: alkanol amines such as MEA, DEA, triethanol amine (TEA), Bishydroxyethylethylene diamine; ethoxylated alcohols, glycerin, glycols such as EG (ethylene glycol), propylene glycol, butylene glycol, hexylene glycol, trimethylol propane, pentaerythritol, neopentyl glycol or the like; Tris & Tetrahydroxy amines; ethoxylated alkyl phenols (limited use due to toxicity problems), Ethoxylated amines such as monoamines such as MDEA and higher amines from 2 to 24 carbons atoms, diamines 2 to 24 carbons carbon atoms, or the like; Polymers, e.g., homopolymers of aspartic acid, soluble homopolymers of acrylic acid, copolymers of acrylic acid and methacrylic acid, terpolymers of acylates, AMPS, etc., hydrolyzed polyacrylamides, poly malic anhydride (PMA); or the like; or mixtures or combinations thereof.

Carbon Dioxide Neutralization

Suitable additives for $CO_2$ neutralization and for use in the compositions of this invention include, without limitation, MEA, DEA, isopropylamine, cyclohexylamine, morpholine, diamines, dimethylaminopropylamine (DMAPA), ethylene diamine, methoxy proplyamine (MOPA), dimethylethanol amine, methyldiethanolamine (MDEA) & oligomers, imidazolines of EDA and homologues and higher adducts, imidazolines of aminoethylethanolamine (AEEA), aminoethylpiperazine, aminoethylethanol amine, di-isopropanol amine, DOW AMP-90™, Angus AMP-95, dialkylamines (of methyl, ethyl, isopropyl), mono alkylamines (methyl, ethyl, isopropyl), trialkyl amines (methyl, ethyl, isopropyl), bishydroxyethylethylene diamine (THEED), or the like or mixtures or combinations thereof.

Paraffin Control

Suitable additives for Paraffin Removal, Dispersion, and/or paraffin Crystal Distribution include, without limitation. CELLOSOLVE™ solvents trademark of DOW Chemcial Company and available from DOW Chemicals Company; CELLOSOLVE™ acetates; Ketones; Acetate and Formate salts and esters; surfactants composed of ethoxylated or propoxylated alcohols, alkyl phenols, and/or amines; methylesters such as coconate, laurate, soyate or other naturally occurring methylesters of fatty acids; sulfonated methylesters such as sulfonated coconate, sulfonated laurate, sulfonated soyate or other sulfonated naturally occurring methylesters of fatty acids; low molecular weight quaternary ammonium chlorides of coconut oils soy oils or $C_{10}$ to $C_{24}$ amines or monohalogenated alkyl and aryl chlorides; quanternary ammonium salts composed of disubstituted (e.g., dicoco, etc.) and lower molecular weight halogenated alkyl and/or aryl chlorides; gemini quaternary salts of dialkyl (methyl, ethyl, propyl, mixed, etc.) tertiary amines and dihalogenated ethanes, propanes, etc. or dihalogenated ethers such as dichloroethyl ether (DCEE), or the like; gemini quaternary salts of alkyl amines or amidopropyl amines, such as cocoamidopropyldimethyl, bis quaternary ammonium salts of DCEE; or mixtures or combinations thereof. Suitable alcohols used in preparation of the surfactants include, without limitation, linear or branched alcohols, specially mixtures of alcohols reacted with ethylene oxide, propylene oxide or higher alkyleneoxide, where the resulting surfactants have a range of HLBs. Suitable alkylphenols used in preparation of the surfactants include, without limitation, nonylphenol, decylphenol, dodecylphenol or other alkylphenols where the alkyl group has between about 4 and about 30 carbon atoms. Suitable amines used in preparation of the surfactants include, without limitation, ethylene diamine (EDA), diethylenetriamine (DETA), or other polyamines. Exemplary examples include QUADROL® a registered trademakr of BASF, Tetrols, Pentrols available from BASF. Suitable alkanolamines include, without limitation, monoethanolamine (MEA), diethanolamine (DEA), reactions products of MEA and/or DEA with coconut oils and acids.

Oxygen Control

The introduction of water downhole often is accompanied by an increase in the oxygen content of downhole fluids due to oxygen dissolved in the introduced water. Thus, the materials introduced downhole must work in oxygen environments or must work sufficiently well until the oxygen content has been depleted by natural reactions. For system that cannot tolerate oxygen, then oxygen must be removed or controlled in any material introduced downhole. The problem is exacerbated during the winter when the injected materials include winterizers such as water, alcohols, glycols, Cellosolves, formates, acetates, or the like and because oxygen solubility is higher to a range of about 14-15 ppm in very cold water. Oxygen can also increase corrosion and scaling. In CCT (capillary coiled tubing) applications using dilute solutions, the injected solutions result in injecting an oxidizing environment ($O_2$) into a reducing environment ($CO_2$, $H_2S$, organic acids, etc.).

Options for controlling oxygen content includes: (1) deaeration of the fluid prior to downhole injection, (2) addition of normal sulfides to product sulfur oxides, but such sulfur oxides can accelerate acid attack on metal surfaces, (3) addition of erythorbates, ascorbates, diethylhydroxyamine or other oxygen reactive compounds that are added to the fluid prior to downhole injection; and (4) addition of corrosion inhibitors or metal passivation agents such as potassium (alkali) salts of esters of glycols, polyhydric alcohol ethyloxylates or other similar corrosion inhibitors. Exemplary examples oxygen and corrosion inhibiting agents include mixtures of tetramethylene diamines, hexamethylene diamines, 1,2-diaminecyclohexane, amine heads, or reaction products of such amines with partial molar equivalents of aldehydes. Other oxygen control agents include salicylic and benzoic amides of polyamines, used especially in alkaline conditions, short chain acetylene diols or similar compounds, phosphate esters, borate glycerols, urea and thiourea salts of bisoxalidines or other compound that either absorb oxygen, react with oxygen or otherwise reduce or eliminate oxygen.

Salt Inhibitors

Suitable salt inhibitors for use in the fluids of this invention include, without limitation, Na Minus-Nitrilotriacetamide available from Clearwater International, LLC of Houston, Tex.

Foam Characteristics

Generally, the foamablefluid systems will produce a foam having a foam height of at least about 400 mL and a half life of at least about 2 minutes. In particular, the produced foam will have a foam height between about least 400 mL and about 800 mL and a half life between about 2 minutes and about 15 minutes or greater depending on the application and the exact formulation of the hydrocarbon fluid of this invention. The stability or half life and foam height of the produced foam is controlled by the amount and type of the viscosifying agents in the composition, by the amount and type of the foaming agents in the composition, by the amount of gas and type of gas in the composition, by the temperature of the composition and by the pressure of the composition. Generally, increasing the amount of the viscosifying agents and/or foaming agents, the foam stability and height can be increase. Generally, the viscosifying agents increase the stability more than the foam height, while the foaming agents increase the foam height. Of course, the foam height is also directly proportional to the amount and type of gas dissolved or absorbed in the fluid.

EXPERIMENTS OF THE INVENTION

Example 1

This example illustrate the preparation of a deformer composition of this invention designated D1.

70 L of distilled water were added to a clean reactor followed by addition of 15 L of DOW CORNING® ANTI-FOAM B available from Dow Corning. The resultant mixture was mixed thoroughly for 5 minutes. Then, 15 L of DOW CORNING® ANTIFOAM 1410 were added with continued mixing for additional 30 minutes to give the defoamer composition of this invention designate D1, which is a milky white liquid having a pH 7.03 and a specific gravity 0.997.

Properties of D1

D1 of Example 1 is a silicone based composition includes a polydimethylsioxane. D1 is non-hazardous and non-toxic to the environment. D1 is effective as a defoamer at low treating concentrations between 0.1 wt. % and 2.0 wt. % or as needed. D1 permits foam-defoam-refoam cycles or permits all Weatherford (WFT) foamers to be recyclable. D1 is a less expensive defoamer than all other defoamer available from Weatherford. D1 has a high thermal stability. D1 has been found to be stable up to 450° F. in the laboratory as evidenced by absence of any degradation (precipitation) or discoloration. Foams defoamed with D1 have been shown to be refoamable in a refoamability of test system. Thus, D1 is suitable for use under hostile conditions for conventional systems. D1 is also compatible with Weatherford foam drilling additives.

Table 1 tabulates the breaking or defoaming characteristics of D1 in a series of four Weatherford foaming systems: FMA™100, KLEANFOAM™, DURAFOAM™ and TRANSFOAM™.

TABLE 1

Defoamer Properties of D1

| Water | Foamer | Foamer Concentration (%) | D1 Concentration (%) | FH[a] | R[b] |
|---|---|---|---|---|---|
| Tap | FMA ™ 100 | 0.5 | 0.8 | 0 | Yes |
| Tap | KLEANFOAM ™ | 0.5 | 0.8 | 0 | Yes |
| Tap | DUROFOAM ™ | 0.5 | 1.0 | 0 | Yes |
| Tap | TRANFOAM ™O | 0.5 | 1.0 | 0 | Yes |

[a]Foam Height
[b]Recyclable

The data of Table 1 clearly shows that D1 at levels of 1 wt. % or less is an effective and efficient defoamer for all four Weatherford foaming systems: FMA™100, KLEAN-FOAM™, DURAFOAM™ and TRANSFOAM™. The data is unique in that this single defoamer is capable of defoaming fluids including all three of the Weatherford foaming systems and that the defoamed fluids are refoamable by adding additional foamer.

Corrosion data is tabulated in Table 2 for a drilling fluid including D1, OMNIFOAM™ and corrosion inhibitor COR-RFOAM™1.

TABLE 2

Compatibility of D1 with Drilling Fluid Additives

| Test ID | Test Fluid | Time (days) | Corr (lbft$^{-2}$yr$^{-1}$) | Piting |
|---|---|---|---|---|
| 1 | Tap[a] + OFHT[b] (2.0%) + D1 (2.0%) | 2 | 7.427 | Heavy |
| 2 | Tap[a] + OF[c] (2.0%) + D1 (2.0% ) + CF1[d] (0.5%)[e] | 2 | 0.199 | Slight |
| 3 | SW[f] (3.5%) + OF[c] (2.0%) + D1 (2.0%) + CF1[d] (0.5%)[e] | 2 | 2.856 | Heavy |
| 4 | SW[f] (3.5%) + OF[c] (2.0%) + D1 (2.0%) | 1 | 2.562 | Medium |
| 5 | SW[f] (3.5%) + OFHT[b] (2.0%) + D1 (2.0%) + CF1[d] (0.2%) | 1 | 0.415 | Slight |
| 6 | SW[f] (3.5%) + OF[c] (2.0%) + D1 (2.0%) + CF1[d] (0.5%) | 1 | 0.791 | None |
| 7 | SW[f] (3.5%) + OF[c] (2.0%) D1 (2.0%) + CF1[d] (0.2%)[e] | 1 | 0.452 | Slight |

[a]Elmendorf Tap Water (containing circa 71 ppm Ca$^{2+}$, 21 ppm Na$^+$ and 15 ppm Mg$^{2+}$ ions).
[b]OMNIFOAM ™ HTis a high thermally and saline stable foamer available from Weatherford International
[c]OMNIFOAM ™ a saline stable foamer available from Weatherford International
[d]CF1 is CORRFOAM ™1, a corrosion inhibitor produced by Weatherford International
[e]pH of fluid system adjust to pH 10
[f]salt water The data in Table 2 evidences the compatibility of D1 in a fluid including OMNIFOAM™ and corrosion inhibitor CORRFOAM™1. The data evidenced not only by the acceptable levels of corrosion in the systems containing D1, the OMNIFOAM™ foamer and the CORRFOAM™1 inhibitor, but also the mixtures evidenced an absence of degradation of any of the components at temperatures up to 250° F. Furthermore, minimal amounts of inhibitor are required for corrosion management in fresh or surprisingly better in seawater based fluids. Test IDs 5 and 7 showed that pH adjustment is not needed saving cost of chemical for pH adjustment.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A defoamer composition comprising, on a volume basis:
between about 40 vol. % and about 80 vol. % distilled water and/or other waters,
between about 10 vol. % and about 30 vol. % of a silicone anti-foam agent including 60.0 wt. % of water, 7.0-13.0 wt. % of a first polydimethylsiloxane, and optionally 5.0 wt. % of methylcellulose, and
between about 10 vol. % and about 30 vol. % of an active silicone anti-foam agent including 70.0 wt. %-90.0 wt. % water, 7.0 wt. %-13.0 wt. % of a second polydimethylsiloxane, 1.0 wt. %-5.0 wt. % hydroxyethyl cellulose, 1.0 wt. %-5.0 wt. % of treated amorphous silica, and <1.0 wt. % of $C_{14-18}$ mono- and di glycerides, where the composition is stable at temperatures up to about 450° F. and is effective at concentration of less than or equal to 500 ppm in all recyclable foamed fluids including recyclable foamed drilling fluids, recyclable foamed completion fluids, recyclable foamed fracturing fluids, recyclable foamed stimulating fluids, and foaming cements used in downhole applications.

2. The composition of claim 1, wherein the defoamer composition comprises:
   between about 50 vol. % and about 80 vol. % distilled water and/or other waters,
   between about 10 vol. % and about 25 vol. % of the silicone anti-foam agent and
   between about 10 vol. % and about 25 vol. % of the active silicone anti-foam agent.

3. The composition of claim 1, wherein the defoamer composition comprises:
   between about 60 vol. % and about 80 vol. % distilled water and/or other waters,
   between about 10 vol. % and about 20 vol. % of the silicone anti-foam agent and
   between about 10 vol. % and about 20 vol. % of the active silicone anti-foam agent.

4. The composition of claim 1, wherein the defoamer composition comprises:
   between about 50 vol. % and about 70 vol. % distilled water and/or other waters,
   between about 15 vol. % and about 25 vol. % of the silicone anti-foam agent and
   between about 15 vol. % and about 25 vol. % of the active silicone anti-foam agent.

5. The composition of claim 1, wherein the defoaming composition is a milky white liquids having a pH of about 7.03 and a specific gravity of about 0.997.

6. The composition of claim 1, wherein the effective concentration is less than or equal to 400 ppm.

7. The composition of claim 1, wherein the effective concentration is less than or equal to 300 ppm.

8. The composition of claim 1, wherein the effective concentration is less than or equal to 250 ppm.

9. The composition of claim 1, wherein the effective concentration is less than or equal to 200 ppm.

10. The composition of claim 1, wherein the foamed fluids include foamed drilling fluids, foamed completion fluids, foamed fracturing fluids, foamed stimulating fluids, foaming cements, and/or other foamed fluids used in downhole operations.

11. A defoamer composition comprising, on a volume basis:
    between about 40 vol. % and about 80 vol. % distilled water and/or other waters,
    between about 10 vol. % and about 30 vol. % of a silicone anti-foam agent including 60.0 wt. % of water, 7.0-13.0 wt. % of a first polydimethylsiloxane, and 5.0 wt. % of methylcellulose, and
    between about 10 vol. % and about 30 vol. % of an active silicone anti-foam agent including 70.0 wt. %-90.0 wt. % water, 7.0 wt. %-13.0 wt. % of a second polydimethylsiloxane, 1.0 wt. %-5.0 wt. % hydroxyethyl cellulose, 1.0 wt. %-5.0 wt. % of treated amorphous silica, and <1.0 wt. % of $C_{14-18}$ mono- and di glycerides,
    where the composition is stable at temperatures up to about 450° F. and is effective at concentration of less than or equal to 500 ppm in all recyclable foamed fluids including recyclable foamed drilling fluids, recyclable foamed completion fluids, recyclable foamed fracturing fluids, recyclable foamed stimulating fluids, and foaming cements used in downhole applications.

12. The composition of claim 11, wherein the defoamer composition comprises:
    between about 50 vol. % and about 80 vol. % distilled water and/or other waters,
    between about 10 vol. % and about 25 vol. % of the silicone anti-foam agent and
    between about 10 vol. % and about 25 vol. % of the active silicone anti-foam agent.

13. The composition of claim 11, wherein the defoamer composition comprises:
    between about 60 vol. % and about 80 vol. % distilled water and/or other waters,
    between about 10 vol. % and about 20 vol. % of the silicone anti-foam agent and
    between about 10 vol. % and about 20 vol. % of the active silicone anti-foam agent.

14. The composition of claim 11, wherein the defoamer composition comprises:
    between about 50 vol. % and about 70 vol. % distilled water and/or other waters,
    between about 15 vol. % and about 25 vol. % of the silicone anti-foam agent and
    between about 15 vol. % and about 25 vol. % of the active silicone anti-foam agent.

15. The composition of claim 11, wherein the defoaming composition is a milky white liquids having a pH of about 7.03 and a specific gravity of about 0.997.

16. The composition of claim 11, wherein the effective concentration is less than or equal to 400 ppm.

17. The composition of claim 11, wherein the effective concentration is less than or equal to 300 ppm.

18. The composition of claim 11, wherein the effective concentration is less than or equal to 250 ppm.

19. The composition of claim 11, wherein the effective concentration is less than or equal to 200 ppm.

20. The composition of claim 11, wherein the foamed fluids include foamed drilling fluids, foamed completion fluids, foamed fracturing fluids, foamed stimulating fluids, foaming cements, and/or other foamed fluids used in downhole operations.

* * * * *